United States Patent
Bodnar et al.

(10) Patent No.: US 7,860,309 B1
(45) Date of Patent: Dec. 28, 2010

(54) MEDIA PUBLISHING SYSTEM WITH METHODOLOGY FOR PARAMETERIZED RENDERING OF IMAGE REGIONS OF INTEREST

(75) Inventors: Eric O. Bodnar, Santa Cruz, CA (US); Venkat Easwar, Cupertino, CA (US)

(73) Assignee: VeriSign, Inc., Dulles, VA (US)

( * ) Notice: Subject to any disclaimer, the term of this patent is extended or adjusted under 35 U.S.C. 154(b) by 1180 days.

(21) Appl. No.: 10/956,430

(22) Filed: Sep. 30, 2004

Related U.S. Application Data

(60) Provisional application No. 60/481,449, filed on Sep. 30, 2003.

(51) Int. Cl.
G06K 9/34 (2006.01)
G06K 9/46 (2006.01)
G06K 9/36 (2006.01)
H04N 1/46 (2006.01)

(52) U.S. Cl. .................. 382/173; 382/164; 382/243; 382/276; 358/538

(58) Field of Classification Search .................. 382/276
See application file for complete search history.

(56) References Cited

U.S. PATENT DOCUMENTS

| | | |
|---|---|---|
| 5,309,257 A | 5/1994 | Bonino et al. |
| 5,347,600 A | 9/1994 | Barnsley et al. |
| 5,613,017 A | 3/1997 | Rao et al. |
| 5,781,901 A | 7/1998 | Kuzuma |
| 5,860,074 A | 1/1999 | Rowe et al. |
| 5,883,640 A | 3/1999 | Hsieh et al. |
| 5,903,723 A | 5/1999 | Beck et al. |
| 5,917,965 A | 6/1999 | Cahill et al. |
| 5,956,044 A | 9/1999 | Giorgianni et al. |
| 6,016,520 A | 1/2000 | Facq et al. |
| 6,031,934 A * | 2/2000 | Ahmad et al. ............... 382/154 |
| 6,072,598 A | 6/2000 | Tso |
| 6,072,902 A | 6/2000 | Myers |
| 6,081,883 A | 6/2000 | Popelka et al. |
| 6,125,201 A | 9/2000 | Zador |
| 6,141,686 A | 10/2000 | Jackowski et al. |
| 6,161,140 A | 12/2000 | Moriya |
| 6,163,626 A | 12/2000 | Andrew |

(Continued)

FOREIGN PATENT DOCUMENTS

DE 199 34 787 2/2001

(Continued)

OTHER PUBLICATIONS

Mohan et al., "Adapting Multimedia Internet Content for Universal Access", IEEE Transactions on Multimedia, vol. 1, No. 1, Mar. 1999, pp. 104-114.*

(Continued)

Primary Examiner—Matthew C Bella
Assistant Examiner—Jose M Torres
(74) Attorney, Agent, or Firm—Blakely, Sokoloff, Taylor & Zafman, LLP; Judith A. Szepesi

(57) ABSTRACT

A method to render images is described. The method comprises having an image including a region of interest, and when processing the image, observing parameters associated with the region of interest.

23 Claims, 12 Drawing Sheets

U.S. PATENT DOCUMENTS

| | | | |
|---|---|---|---|
| 6,167,441 A | 12/2000 | Himmel | |
| 6,185,625 B1* | 2/2001 | Tso et al. | 709/247 |
| 6,195,696 B1 | 2/2001 | Baber et al. | |
| 6,202,097 B1 | 3/2001 | Foster et al. | |
| 6,256,666 B1 | 7/2001 | Singhal | |
| 6,275,869 B1 | 8/2001 | Sieffert et al. | |
| 6,278,449 B1 | 8/2001 | Sugiarto et al. | |
| 6,278,491 B1 | 8/2001 | Wang et al. | |
| 6,289,375 B1 | 9/2001 | Knight et al. | |
| 6,300,947 B1 | 10/2001 | Kanevsky | |
| 6,330,073 B1 | 12/2001 | Sciatto | |
| 6,334,126 B1 | 12/2001 | Nagatomo et al. | |
| 6,341,316 B1 | 1/2002 | Kloba et al. | |
| 6,351,547 B1 | 2/2002 | Johnson et al. | |
| 6,351,568 B1 | 2/2002 | Andrew | |
| 6,385,772 B1 | 5/2002 | Courtney | |
| 6,389,460 B1 | 5/2002 | Stewart et al. | |
| 6,411,685 B1 | 6/2002 | O'Neal | |
| 6,414,679 B1 | 7/2002 | Miodonski et al. | |
| 6,421,733 B1 | 7/2002 | Tso et al. | |
| 6,438,272 B1 | 8/2002 | Huang et al. | |
| 6,441,913 B1 | 8/2002 | Anabuki et al. | |
| 6,456,307 B1* | 9/2002 | Bates et al. | 715/838 |
| 6,473,794 B1 | 10/2002 | Guheen et al. | |
| 6,490,675 B1 | 12/2002 | Sugiura | |
| 6,493,758 B1 | 12/2002 | McLain | |
| 6,592,629 B1 | 7/2003 | Cullen et al. | |
| 6,724,721 B1 | 4/2004 | Cheriton | |
| 6,742,043 B1 | 5/2004 | Moussa et al. | |
| 6,745,235 B2 | 6/2004 | Baca | |
| 6,760,762 B2 | 7/2004 | Pezzutti | |
| 6,779,042 B1 | 8/2004 | Kloba et al. | |
| 6,785,730 B1 | 8/2004 | Taylor | |
| 6,914,622 B1* | 7/2005 | Smith et al. | 348/14.05 |
| 6,925,595 B1 | 8/2005 | Whitledge et al. | |
| 6,961,754 B2* | 11/2005 | Christopoulos et al. | 709/204 |
| 7,031,317 B2* | 4/2006 | Negishi et al. | 370/395.2 |
| 7,051,040 B2 | 5/2006 | Easwar | |
| 7,149,370 B2* | 12/2006 | Willner et al. | 382/305 |
| 7,260,614 B2* | 8/2007 | Deshpande et al. | 709/217 |
| 7,278,117 B2* | 10/2007 | Gargi | 715/864 |
| 7,441,047 B2* | 10/2008 | Gibbs et al. | 709/248 |
| 7,581,027 B2* | 8/2009 | Boliek et al. | 709/247 |
| 2002/0016818 A1 | 2/2002 | Kirani et al. | |
| 2002/0116531 A1 | 8/2002 | Chu | |
| 2003/0041110 A1 | 2/2003 | Wenocur et al. | |
| 2003/0059124 A1 | 3/2003 | Center | |
| 2003/0110234 A1 | 6/2003 | Egli et al. | |
| 2004/0117735 A1* | 6/2004 | Breen | 715/517 |
| 2004/0170300 A1* | 9/2004 | Jouppi | 382/103 |
| 2006/0256130 A1* | 11/2006 | Gonzalez | 345/619 |

FOREIGN PATENT DOCUMENTS

| | | |
|---|---|---|
| DE | 100 50 172 | 4/2001 |
| EP | 0763943 | 3/1997 |
| EP | 0811939 | 12/1997 |
| EP | 0950969 | 10/1999 |
| EP | 0992922 | 4/2000 |
| EP | 1109371 | 6/2001 |
| EP | 1109372 | 6/2001 |
| WO | WO 97/49252 | 12/1997 |
| WO | WO 98/43177 | 10/1998 |
| WO | WO 99/60793 | 11/1999 |
| WO | WO 00/72534 | 11/2000 |
| WO | WO 00/75859 | 12/2000 |
| WO | WO 01/01663 | 1/2001 |
| WO | WO 02/13031 | 2/2002 |

OTHER PUBLICATIONS

Joshi, et al, "On Disconnected Browsing of Distributed Information," Seventh International Workshop on Research Issues in Data Engineering, 1997 Proceedings, Birmingham, UK, Apr. 7-8, 1997, IEEE Comput. Soc., Los Alamitos, CA, 0pp. 101-107.

Reynolds, Franklin, et al, "Composite Capability/preference Profiles (CC/PP): A user side framework for content negotiation" Internet, Online!, Jul. 29, 1999, XP002257669 Retrieved from the Internet: <URL:www.w3.org/TR/NOTE-CCPP>.

PCT International Search Report, PCT/US02/36064, 10 pages.

* cited by examiner

Use Cursor to Select Area of Interest

Member of Group?
Yes/No

Identify Layer(s) containing Area of Interest

Member of Group?
Yes/No

Aspect Ratio Lock?
Minimum Pixel Size?
Relative Size Lock?
Relative Location Lock?
Color Range?

910

920

930

940

MEDIA PUBLISHING SYSTEM WITH METHODOLOGY FOR PARAMETERIZED RENDERING OF IMAGE REGIONS OF INTEREST

CROSS REFERENCE TO RELATED APPLICATIONS

The present invention claims benefit of the provisional application Ser. No. 60/481,449, filed Sep. 30, 2003, which is incorporated herein by reference.

The present application is related to the following commonly-owned, presently-pending application(s): application Ser. No. 10/010,616, filed Nov. 8, 2001, entitled "System and Methodology for Delivering Media to Multiple Disparate Client Devices Based on Their Capabilities". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates generally to the rendering of media objects (e.g., images, sounds, video, documents, and the like) and, more particularly, relates to identifying and handling specified "regions of interest" in an image.

BACKGROUND

In today's connected environment, a variety of digital image, digital video, and digital audio products are currently available to consumers. Regardless of how digital media is recorded, at some later point in time, the information must become available to other devices—that is, become available to a larger network of digital devices, so that such information may be displayed on a screen, printed to hard copy, stored, or shared with other people. Today, a large number of Web sites exist on the Internet with server computers having the capability to organize and display images, video, audio, and other types of media and digital objects. In a complementary manner, a multitude of different client devices exist with sufficient graphics capabilities for potentially viewing (and/or listening to) this media. For instance, such client devices range from desktop or laptop computers running Web browser software to handheld devices (e.g., personal digital assistants running under Palm or Windows CE), all connected to the Internet over TCP/IP, each with the capability of displaying information. The result is a vast array of media devices with varying levels of capability.

With the continuing explosive growth in cellphone usage, limited-capability client devices are increasingly prevalent, particularly hybrid devices that combine the functionality of a computer and a cell phone into a single device. Many of these devices have constrained display screen size. A given device may have relatively high resolution capability to display a detailed image, for example, but the physical dimensions of the screen itself may be so small as to prevent proper viewing of the subject matter of the image. Commonly, however, limited-capability client devices will often compromise resolution and color capability, thus exacerbating the problem posed by limited (physical) screen size. At the same time, a large body of rich media content exists, through publishers, for potential viewing or consumption by these connected devices.

More particularly, there exists a large body of branded content or assets that presently has not been made available for consumption by limited-capability devices. Here, the quality of the content is directly proportional to the value of the content. Take, for example, branded content, such as the rendering of a popular cartoon character image on a client device. A rendered cartoon that does not look like the branded version people are familiar with is not valuable to users. Therefore, an online user would not pay much for an electronic greeting card or screensaver featuring pre-generated branded content if that content was not rendered in a matter to preserve the branding. In particular, the inherent value in the quality of the content is only preserved to the extent that quality rendering of the content is preserved. Even if the content itself is free (e.g., free artwork), the underlying branding of the content may be very valuable (e.g., corporate logos, trademarks, and the like) and hence maintenance of the integrity of the quality of the content is important to the supplier.

Precious (i.e., very valuable) branded content is especially problematic in this regard. In the process of transcoding or otherwise transforming content from a source format to a format acceptable to a given target device, two immediate issues are encountered: (1) aspect ratio changes (e.g., changing from square image to tall rectangular image), and (2) pixel reduction (caused by target resolution changes). Both of these impact the representation of the subject matter (e.g., character, in branded content), such that the impact is often unsatisfactory to the original content provider. Content providers are loath to permit consumption of their content by users with limited-capability devices, for fear that that may diminish their brands. As a result, this poses a barrier to entry for publication of rich media content, notwithstanding the fact that the media content providers themselves do want to deliver the content in order to better exploit these assets.

What is needed is a system with methodologies that permit content providers, media vendors, and the like to "parameterize" the way the output is delivered to the target device (e.g., handset device), based on what particular features are encountered at the target device. In this manner, delivery of media content may be controlled via a mechanism that preserves integrity of the content subject matter (e.g., branded content). The present invention fulfills this and other needs.

SUMMARY

A method to render images is described. The method comprises having an image including a region of interest, and when processing the image, observing parameters associated with the region of interest.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Glossary

Figure 1:
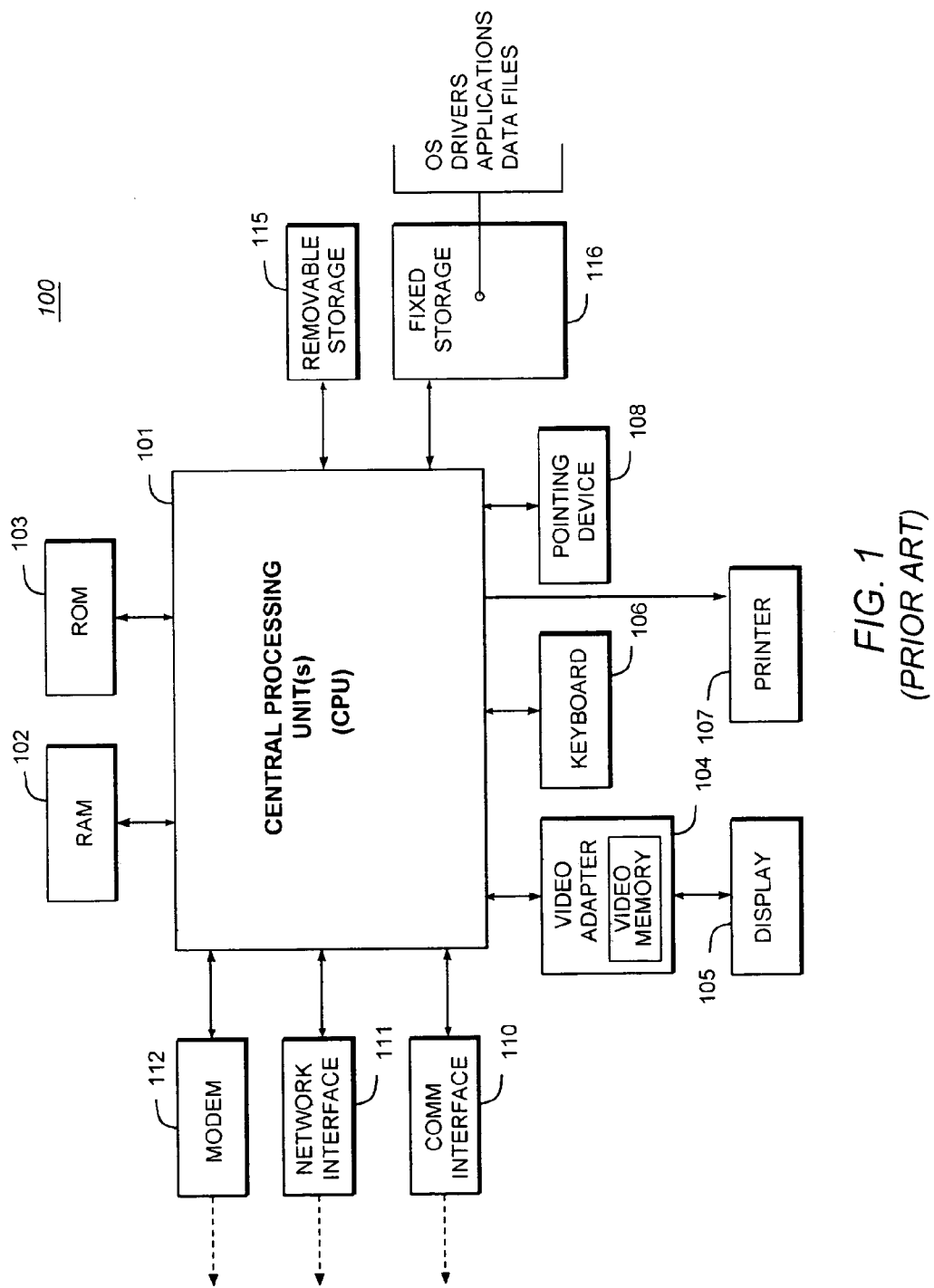
FIG. 1 is a block diagram of one embodiment of a computer system in which software-implemented processes of the present invention may be embodied.

The following definitions are offered for purposes of illustration, not limitation, in order to assist with understanding the discussion that follows.

Bounding box: A bounding box is a shape that encloses a region of interest. The bounding block may be a regular polygon that is parallel to the equator. It is used to represent, in a general way, the location of a geographic area. In one embodiment, the bounding box is represented by two latitude and two longitude values. In another embodiment, the bounding box may be defined by a center and a radius to define a circular area. In another embodiment, the bounding box may be free-form in shape.

Color palette: A table of colors that are referenced by the pixel values in an indexed color image. Color table, color map, and color palette may be used interchangeably.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML documents is available in the technical and trade literature; see e.g., HTML Specification available from W3C.org.

HTTP: HTTP stands for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in RFC 2616: Hypertext Transfer Protocol—HTTP/1.1, the disclosure of which is hereby incorporated by reference. RFC 2616 is available from the World Wide Web Consortium (W3C), and is currently available via the Internet (e.g., W3C.org).

Images: Refers to both raster-based (e.g., bitmap) and vector-based digital images or pictures. Images may be single layer (e.g., single bitmap layer) or multilayer (e.g., two or more separate bitmap layers).

JPEG: Full-size digital images are maintained in a Joint Photographic Experts Group or JPEG format. The JPEG compression format was standardized by ISO in August 1990. See e.g., JPEG Technical Specification, currently available on the Internet (e.g., from JPEG.org). Note that JPEG is only one of the formats available for images.

XML: Extensible Markup Language, a specification developed by the W3C. XML is a pared-down version of SGML. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (W3C.org).

Introduction

Referring to the figures, exemplary embodiments of the invention will now be described. The following description will focus an embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

It will be appreciated by those of ordinary skill in the art that any configuration of the system may be used for various purposes according to the particular implementation. The control logic or software implementing the present invention can be stored in main memory 1350, mass storage device 1325, or other storage medium locally or remotely accessible to processor 1310.

It will be apparent to those of ordinary skill in the art that the system, method, and process described herein can be implemented as software stored in main memory 1350 or read only memory 1320 and executed by processor 1310. This control logic or software may also be resident on an article of manufacture comprising a computer readable medium having computer readable program code embodied therein and being readable by the mass storage device 1325 and for causing the processor 1310 to operate in accordance with the methods and teachings herein.

The present invention may also be embodied in a handheld or portable device containing a subset of the computer hardware components described above. For example, the handheld device may be configured to contain only the bus 1315, the processor 1310, and memory 1350 and/or 1325. The present invention may also be embodied in a special purpose appliance including a subset of the computer hardware components described above. For example, the appliance may include a processor 1310, a data storage device 1325, a bus 1315, and memory 1350, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 1310. A machine-readable medium includes any mechanism for storing or transmitting information in a form readable by a machine (e.g. a compute). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

Basic System Software

Figure 2:
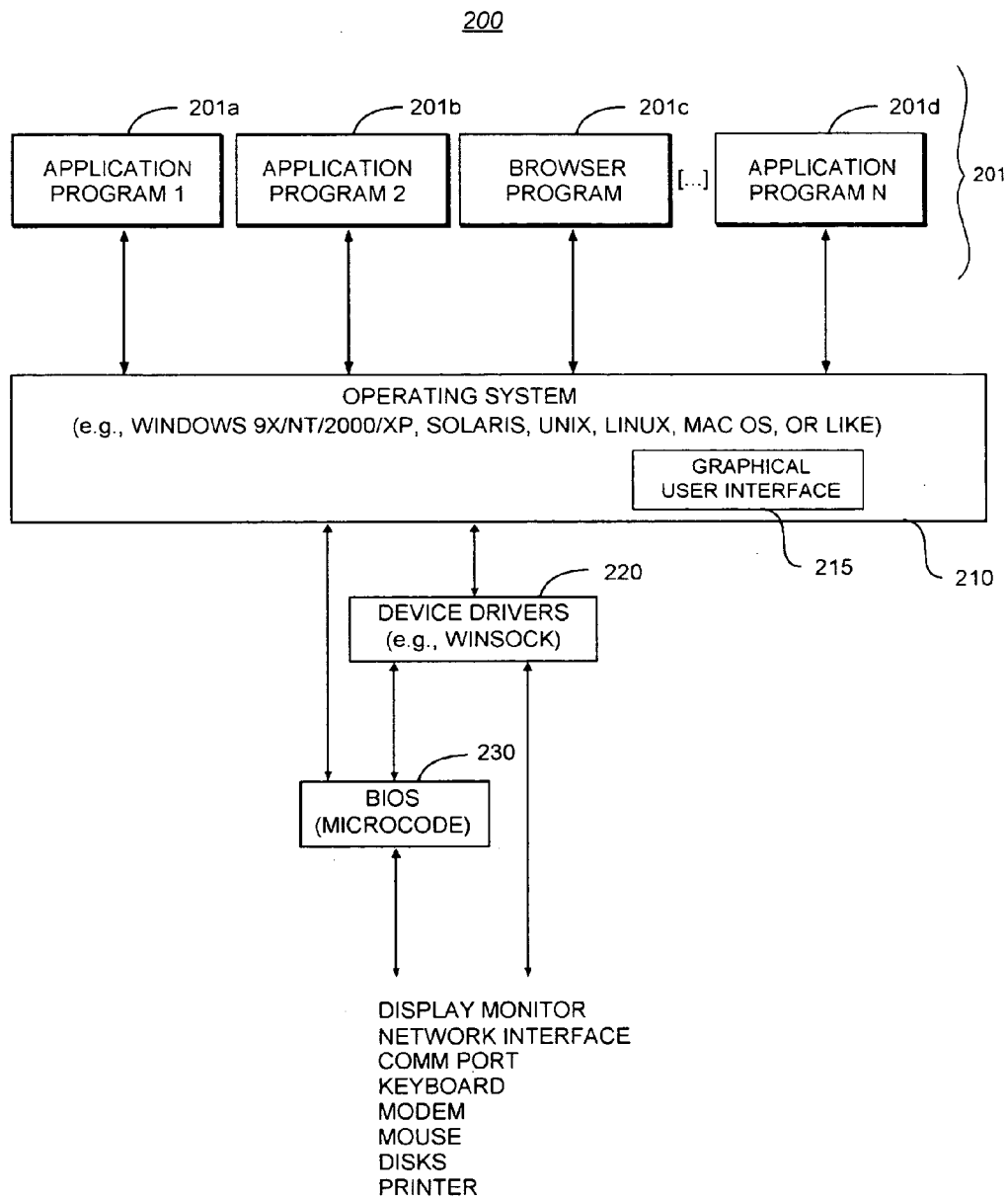
FIG. 2 is a block diagram of one embodiment of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., desktop computers, handheld computing devices, "smart" cellular phone devices, and the like). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview

The approach adopted by the present invention is to provide the content vendor with a control mechanism that may be applied up front so that a certain guaranteed output quality is attained. In one embodiment, the content vendor is able to specify certain parameters up-front that must be met in order to render the content at a given target device. In one embodiment, applicable control logic prevents the rendering of the content at the given target device that cannot meet the parameters.

Today, tools exist that allow one to characterize a given device. At the same time, a given image is self-characterizing, to the extent that it is straightforward to determine the image's underlying attributes, including for instance resolution, color information, and so forth. In one embodiment, this type of information is available as metadata attached to the image. The metadata may be part of the image itself, part of a header attached to the image, or in a different file from the image. Given the ability to characterize a target device and the ability to determine a given image's underlying attributes, one may transcode or map the source image to an appropriate output image (i.e., compatible with a given target device). In accordance with the present invention, the foregoing is modified to include a "publishing layer" that augments the media being published with metadata in order to provide a certain set of requirements that are applied in the rendering process.

For image data, the system of the present invention allows user specification of components of the image that are to receive priority (described below) in order to preserve integrity of the subject matter. Consider, for example, a multi-layer image comprising a foreground bitmap overlaid on a background bitmap, with the foreground bitmap having a branded character and the background bitmap displaying background scenery. In one embodiment, the system allows the user to create metadata prioritizing the foreground bitmap of the image. This layer is declared a "region of interest." In the case of an image comprising a single bitmap, the system allows the user or to identify one or more "regions of interest" within the image itself that are to receive priority. In one embodiment, a region of interest may be specified by a bounding box defined by the user. In one embodiment, the user may create the bounding box using the mouse, a keyboard, auto-selection or other selection mechanism. As noted above the bounding box may be a rectangular subregion of the image, a circular subregion of the image, a subregion defined by any regular shape, or a free-form region. For example, the corporate logo of a company may be a free-form subregion that is defined as the region of interest. In one embodiment, the system automatically creates a separate layer for the selected region of interest, to simplify the process.

For example, a content vendor may select a branded character in an image as the region of interest. In this example, "user" refers to a worker at the content provider. This results in the creation of metadata for the image. In one embodiment, the metadata is otherwise not an element of the image data. In another embodiment, the metadata indicating one or more regions of interest is added to existing metadata describing the image. More particularly, the newly-created metadata specifies the application of a certain set of user-specified restrictions to a particular region of the image.

The practical impact of the application of the restrictions is as follows. During rendering of a given image at a target device, the user-specified metadata indicates that integrity of the region of interest is preserved. The integrity, in one embodiment, is defined by the user set parameters, and may include size relationship, proportion, minimum size, color, etc. In one embodiment, the system may sacrifice fidelity of the other regions if required to ensure that the region(s) of interest are properly rendered. Thus, for example, portions of the background may be sacrificed in order to preserve the integrity of the branded content. Portions of the image that are within the region of interest, on the other hand, are required to appear at the target device.

This approach solves the following problem. With respect to the aspect ratio problem, the traditional solution has been to determine the largest image that will fit (horizontally and vertically) within the bounding box of the target device's display area. Consider, for instance, the case of displaying a landscape image on a portrait-oriented display screen. In that case, the user ends up with the landscape (longest) dimension being shortened to the short side of the portrait screen. As the image is reduced in this matter, the user is left with two large blank areas (e.g., blank margins above and below the image). In contrast, with the approach of the present invention, one may declare a portrait-oriented region of interest within the landscape-oriented image. Therefore, instead of attempting to squeeze the entire landscape-oriented image into the target's portrait-oriented screen, the system need only create a best fit for the region of interest. Everything else outside the region of interest may bleed off the sides of the screen. In this manner, the target device's screen may be completely filled (i.e., no blank spaces). Further, the particular branded content (region of interest) is effectively shown zoomed in appropriately (for that display).

Additional benefits are possible. The rendering system, once apprised of the region of interest, may prioritize that region during image rendering. For example, the system may prioritize the image's color table based on the colors that are predominant in the region of interest. In one implementation, a weighting factor may be defined that specifies a hit ratio relative to the region of interest. A 75% weighting factor, for instance, indicates that 75% of the color hits in the color table must come from the region of interest (with the other 25% being allowed to come from outside the region of interest. In the process of optimizing a color palette, such as when transcoding from a true color image to a 256-color GIF, the system may optimize the color palette to contain most of the colors from the region of interest. This gives the content provider the ability to mandate the rendering of the region of interest to the maximum realistic quality attainable, including doing so at the expense of lesser regions if required.

The metadata created for specifying the region of interest may be maintained as an auxiliary file and/or incorporated into the underlying image file, in instances where support for storing such data is available. Typically, online systems will provide access to content via some sort of indexable mechanism, commonly using a database. Often, such a database is already used to store additional attribute information for images, such as timestamps, access rights/privileges, and the like. Therefore, the region of interest metadata, in one embodiment, is specified as an auxiliary file or information that is associated with a given image file. In one embodiment the metadata information is part of the indexable mechanism. In one embodiment, the metadata is either stored as an entry within the database itself or accessible via a pointer or reference stored within the database.

In one embodiment, the region of interest metadata is stored as a separate auxiliary file, in XML format, that is pointed to by the database. The auxiliary XML file is structured to specify one or more regions of interest using region XML tags, in one embodiment. Each region may be specified as a bounding box of a particular size and format that is located at a particular position within the image.

In one embodiment, each region is associated with a set of one or more (optional) rules that govern the rendering of the region. In one embodiment, this may be conveniently done using ancillary rule XML tags, with various subtags or tag attributes being defined to represent the corresponding restrictions, requirements, or additional characteristics (e.g., rendering hints) that are associated with a given region of interest. If a given declared region of interest is not associated with any rules tags, then the system may apply default behavior/restrictions. In one embodiment the default behavior is to retain the aspect ratio of the region of interest, while not placing a restriction on the color fidelity or size. In another embodiment, another default behavior may be specified.

In the case of additional characteristics or rendering hints, the tags may specify bracketing or minimum scale information. For example, given a particular region of interest, the system may determine what is the minimum resolution size allowable for that region of interest. If the target screen area were less than the minimum resolution size, then rendering of the image on that particular target could the disabled, in one embodiment. In another embodiment, an alternative substitute image would be rendered. In that case, the target device does not have adequate display capability to render the image in a manner that is suitable for presentation of the designated region of interest. Similarly, the metadata may specify that the aspect ratio must be preserved (i.e., rendered as is—no shrinking or stretching), so that the region of interest is protected against image distortion.

One logical example of regions of interest that require a certain size and aspect ratio is logos. The logo of IBM or Mickey Mouse has a very specific aspect ratio and appearance, and that is part of the protected mark. Alternative regions of interest may, for example, include people's faces, an image showing relative proportions (like a ruler next to an object), an object that is for sale the distortion of which would potentially reduce its value, like art or sculpture, etc. Note that in one embodiment, the region of interest may define the entire image. The size of the region of interest is not limited, in one embodiment.

The metadata information may be manually entered as user-specified parameters. In one embodiment, a Web-based GUI (graphical user interface) tool is provided to simplify the entry of the metadata. As various images are added to a catalog (e.g., catalog of online content), the user charged with adding the images may take the opportunity to specify one or more regions of interest (and associated restrictions/requirements/characteristics) at the time an image is added.

In one embodiment, the system provides a test display. Thus, the region of interest may be tested by invoking a test mode that transforms the image to a particular emulated target's size, resolution, and color palette (e.g., 100×100 pixel target screen having 256 color display capability). If the test results are unsatisfactory, the user may modify selection of the region of interest and/or modify the associated parameters and then repeat testing until satisfactory results are obtained. By providing up front parameters, the present invention facilitates the bulk transformation or transcoding of content for a variety of disparate target devices.

In one embodiment, the user may indicate a certain image component, such as a logo, which should be automatically identified as the region of interest for a set of documents. For example, the user may select the logo in a first image. The user may then indicate that the identical logo, when found, should be marked as the region of interest in other images. The system, in one embodiment, automatically attempts to identify the corresponding regions of interest in the other documents. In one embodiment, a user may monitor the process and make corrections.

In one embodiment, the user may indicate that a certain image layer, for example layer 0, contains the region of interest for a set of files. After this indication, the user may batch-upload images, and the system may automatically create the ROI (region of interest) metadata in accordance with the user's instructions. Of course, different layers, or selection methods may be indicated by the user.

System Components

Figure 3:
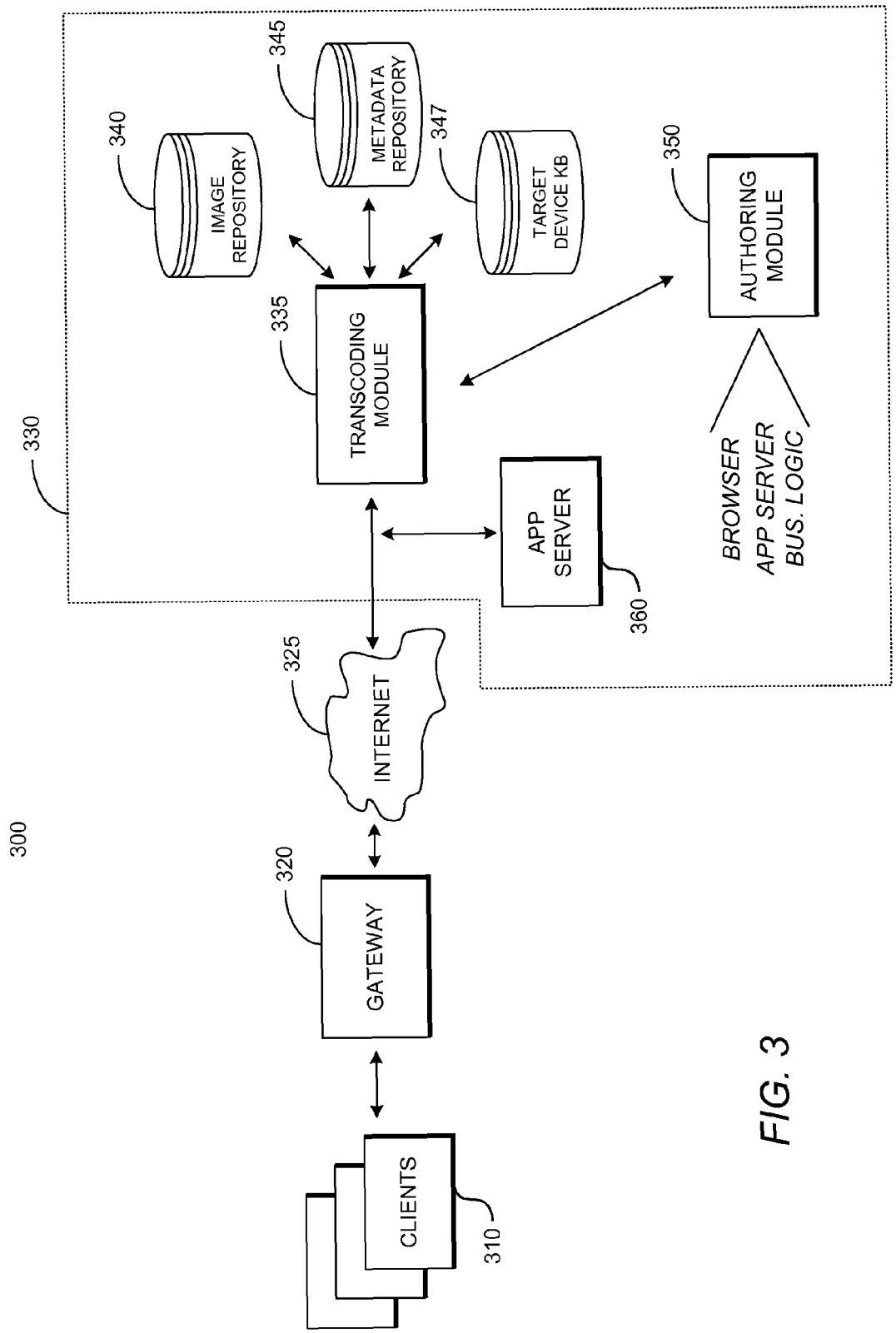
FIG. 3 is a block diagram of one embodiment of a media content delivery system of the present invention.

As shown in FIG. 3, a media content delivery system 300 of the present invention includes clients 310 that connect via a gateway 320 to the Internet 325. The clients 310 include the client devices that access the system. Examples include a Web client (e.g., browser), a mobile handset device (e.g., PDA or cellphone device), a desktop (PC) application (e.g., Photoshop), or the like. These represent the target destination for the media content. In one embodiment, the client devices communicate through the gateway 320. The gateway 320 may be used to assist with characterizing the various client devices. The characterization of client devices itself may be done in a straightforward manner, such as indicating that a particular client is an Internet Explorer 6.0 browser client. In one embodiment, if the device is a cellular telephone, the response header received from the device indicates the make and model of the telephone. This information can be looked up to identify the characteristics of the display.

In one embodiment, the clients 310 communicate with a media publishing system 330 over a network 325. The media publishing system 330 includes a transcoding module 335. In one embodiment, the transcoding module 335 is coupled to an image repository 340 and an image metadata repository 345. In another embodiment, a single database may store both image and metadata information. Additionally, in one embodiment, the transcoding module 335 communicates with a target device information database 347. For an embodiment that includes an authoring interface, the media publishing system 330 includes an authoring module 350 that facilitates the creation of metadata information. The authoring module 350 in one embodiment includes or accesses one or more of: browser, application server, and business logic modules.

The transcoding module 335 includes a core transcoding engine that can take media input and convert it into an appropriate format for a given target device, such as taking an input JPEG and producing a scaled output GIF. A suitable transcoding module is described in further detail in commonly-owned, co-pending application Ser. No. 10/010,616, filed Nov. 8, 2001, entitled "System and Methodology for Delivering Media to Multiple Disparate Client Devices Based on Their Capabilities", by Mietz Egli et al.

The target device information database 347 feeds device capability information into the transcoding module 335, based on the particular client device specified by the gateway 320. In one embodiment, the target device information database 347 describes capability parameters for a given target device so that the transcoding module 335 can properly characterize a given client device even when the client device itself is unable to specify its capabilities. This provides the transcoding module 335 with rules for how to transcode a particular piece of content for a given client.

In one embodiment, the images (or other media content) are maintained in the image repository 340. The images exist in conjunction with corresponding image metadata. In one embodiment, the metadata is maintained by the metadata repository 345. The underlying attributes that comprise a given instance of metadata may be described using XML tags as previously discussed. In one embodiment, a conventional indexing scheme may be used to establish a correspondence between a given image and its associated metadata. For example, a uniform resource indicator (URI) value could be associated with each image, such that the physical image file and corresponding metadata XML file may easily be retrieved.

The foregoing represents a core implementation of the system 330. However, a practical implementation may also include authoring facilities to simplify the user task of specifying regions of interest and constraints that comprise image metadata. For example, the system may include an authoring module 350 that allows the user to create and edit metadata. In one embodiment, the authoring module 350 uses a browser powered by an application server with access to appropriate business logic to create and edit metadata. The authoring module, in one embodiment, includes an authentication scheme to ensure that only authorized users are allowed to create and edit image metadata. Although the authoring module 350 facilitates metadata creation and management, there is nothing preventing the use of manually created metadata. For example, the files may be created using a text editor.

Additionally, the metadata may be system created or augmented. For example, the system may be integrated with existing recognition techniques for locating subimages within an image to automate the generation of image metadata. This type of image recognition is known in the art. Such automation may be particular desirable when processing a large quantity of images of a uniform type (e.g., baseball card images, images with logos, etc.).

The above system may be further enhanced by inclusion of an application server 360, which serves to apply additional rendering techniques based on the above-mentioned image metadata. The application server 360, which may serve Web pages to the clients 310, could include content images using the above mentioned best fit approach, or may use other techniques. In knowing that a given image contains one or more defined regions of interest, the application server 360 may serve up a Web page that includes additional functionality, such as zoom buttons, customized for the detected regions of interest. Thus, in this manner, the application server 360 may include auxiliary user interface elements that allow approaches other than a default best fit approach to be applied.

With the knowledge of one or more particular regions of interest, the system may in fact tweak or modify the scaling, size, resolution, color depth, or the like, or may include value-added user interface elements in order to enhance the user interaction with the regions of interest, including:

(1) Affect rendering,
(2) Provide automated user interface elements, and
(3) Define certain rights or privileges for a given region of interest.

Providing a post-processing DRM management scheme for the image allows a system to differentiate the rights for the general piece of media versus the region of interest, such as allowing modification of a background, but at the same time denying modification of a foreground; or allowing the region of interest to be zoomed in on, but not saved as a file to a device.

Detailed Operation

The following description presents a method that may be implemented using computer-executable instructions, for directing operation of a device under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

Figure 4A:
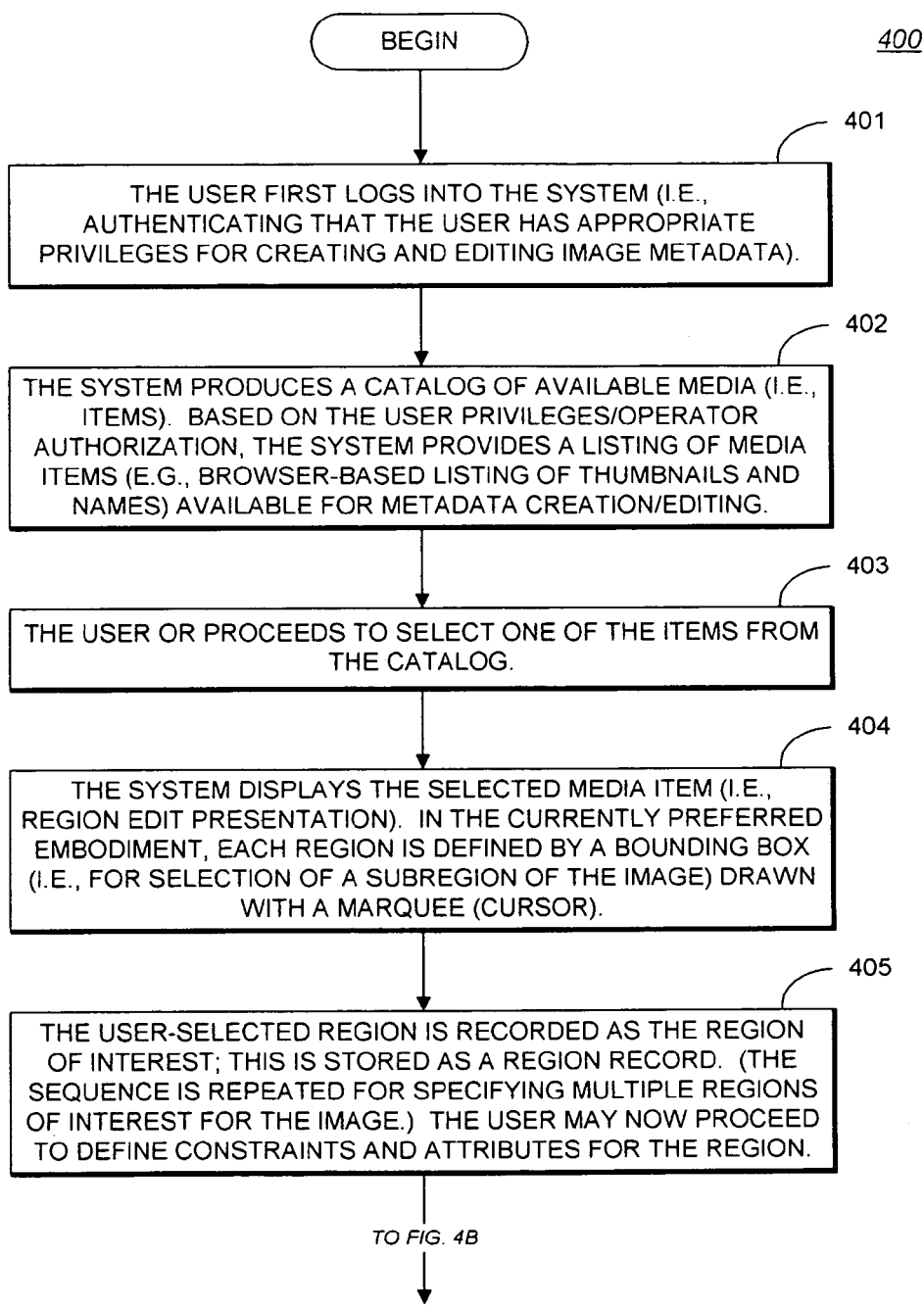
FIGS. 4A-B is a flowchart illustrating one embodiment of a metadata creation/entry process of the present invention.
Figure 4B:
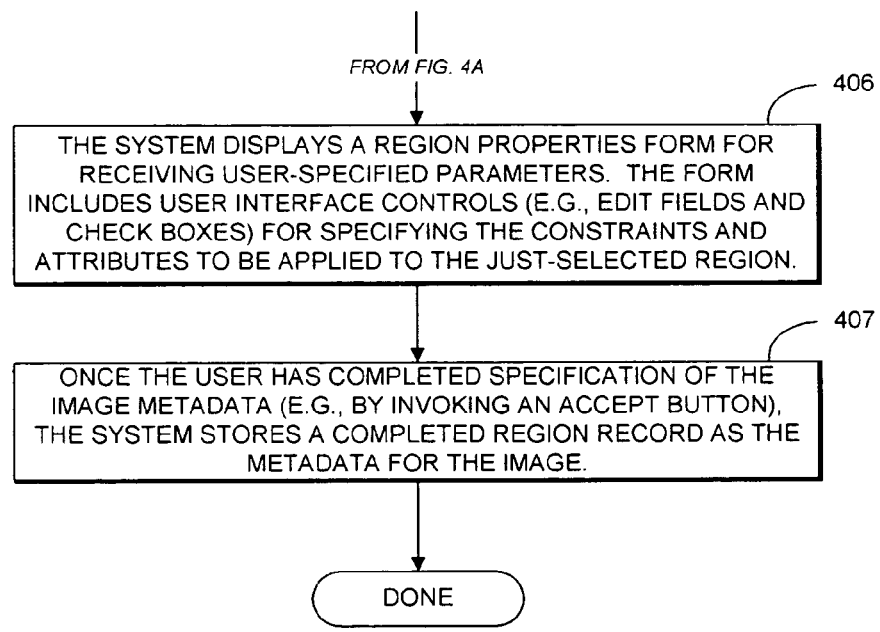

FIGS. 4A-B comprise a flowchart illustrating one embodiment of a metadata creation/entry process 400 of the present invention. This process, in one embodiment, defines a region of interest and specifies auxiliary information (e.g., constraints and attributes). As shown at block 401, the user first logs into the system (i.e., authenticating that the user has appropriate privileges for creating and editing image metadata). At block 402, the system produces a catalog of available media (i.e., items). Based on the user privileges/operator authorization, the system provides a listing of media items (e.g., browser-based listing of thumbnails and names) available for metadata creation/editing. The user or proceeds to select one of the items from the catalog, at block 403.

Next, at block 404, the system displays the selected media item (i.e., region edit presentation). For example, the selected media item may be displayed in an edit window with accompanying user interface controls that allow the user to easily define a region of interest for the item (e.g., branded content within an image). In one embodiment, each region is defined by a bounding box. The bounding box, in one embodiment is defined using the cursor, keyboard, or other user interface. In one embodiment, the "bounding box" may be defined by one or more layers in a multi-layer imager.

Therefore, at block 405, the user-selected region is recorded as the region of interest; this is stored as a region record. (The sequence is repeated for specifying multiple regions of interest for the image.)

The user may now proceed to define constraints and attributes for the region. Thus, at block 406, the system displays a region properties form for receiving user-specified parameters. The form includes user interface controls (e.g., edit fields and check boxes) for specifying the constraints and attributes to be applied to the just-selected region. Examples include minimum resolution, permitted/prohibited aspect ratio change, percentage color space change, etc. The form includes a test button, in one embodiment, to allow for the user to preview the image with of the parameters that have just been entered. Once the user has completed specification of the image metadata (e.g., by clicking on the "Accept" button), the system stores a completed region record as the metadata for the image, as indicated by block 407. Thereafter, the process is complete, or is repeated for another image.

Figure 5A:
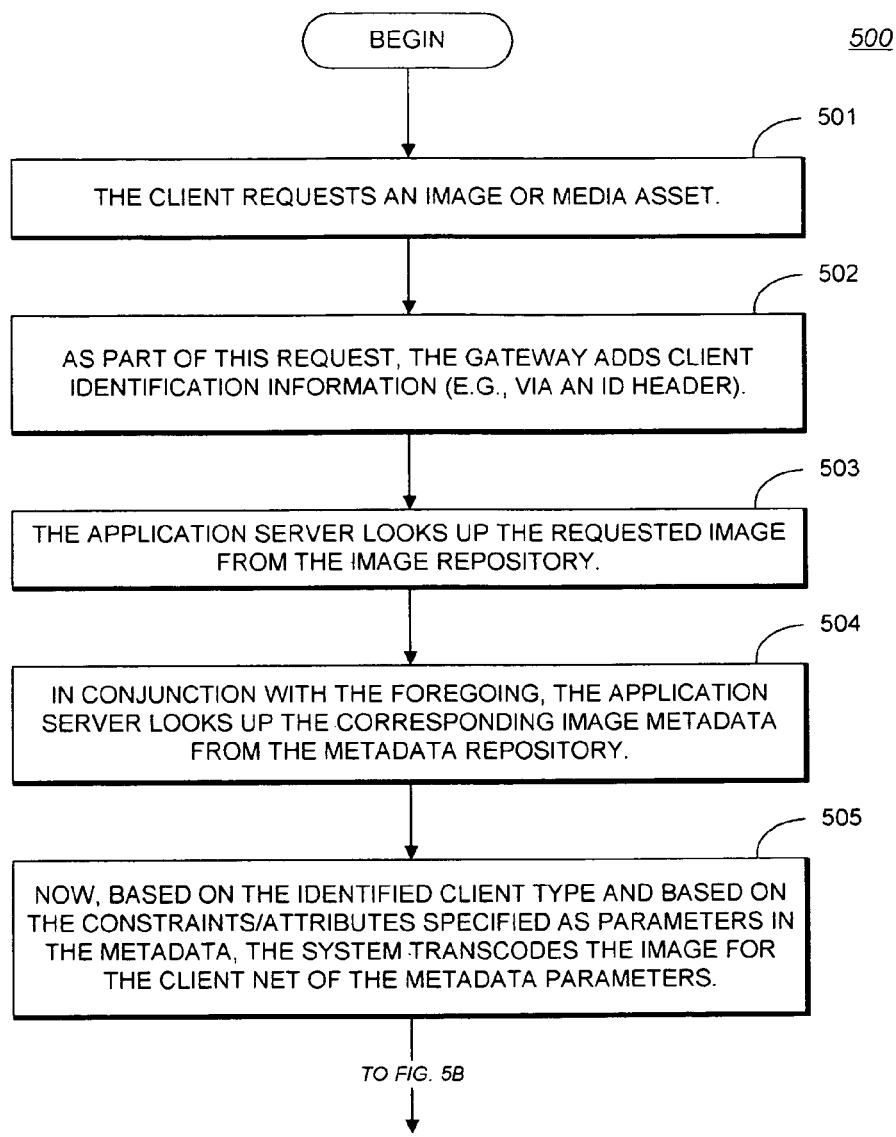
FIGS. 5A-B is a flowchart illustrating one embodiment of a media delivery process of the present invention.
Figure 5B:
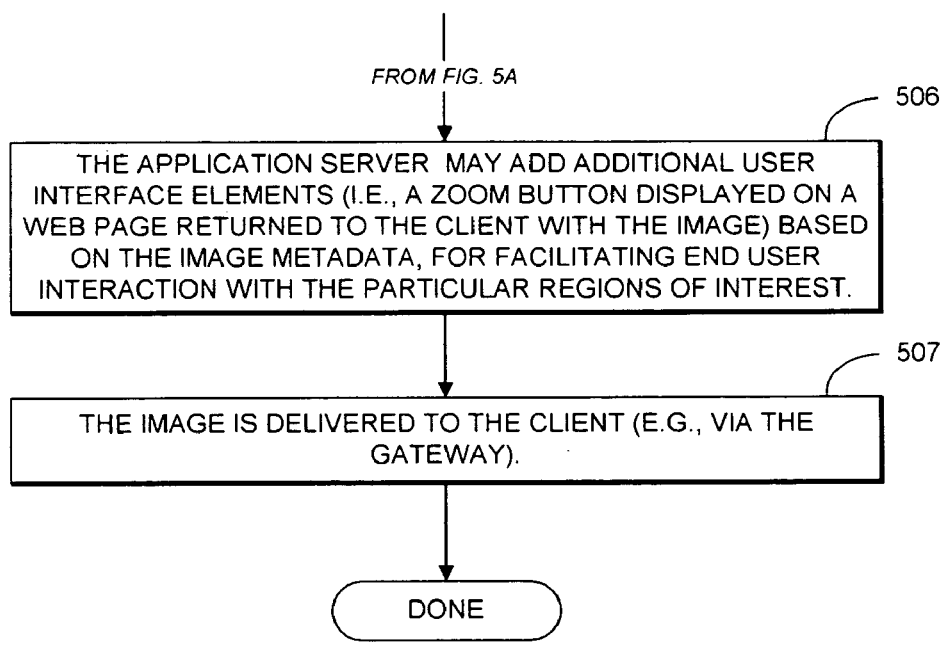

FIGS. 5A and B comprise a flowchart illustrating one embodiment of a media delivery process 500 of the present invention. The process begins with a given the client requesting image or media asset, as shown at block 501. As part of this request, the gateway adds client identification information (in one embodiment via an ID header) to the request, at block 502. In the case of Microsoft Internet Explorer, for example, the browser identifies itself during HTTP requests (i.e., gateway at Internet service provider). In the case of a cellular phone, the gateway at the cell phone provider that the cellular phone connects into tags the request with additional data that may serve to identify the cellular phone (cell phone model number). In one embodiment, the identification functionality may be subsumed into the client and/or pushed to downstream components. For example, in one embodiment, the identification may be performed by capability determination logic in the transcoding module or application server.

At block 503, the application server looks up the requested image from the image repository. In conjunction with the foregoing, the application server looks up the corresponding image metadata from the metadata repository, as shown at block 504. Now, based on the identified client type and based on the constraints/attributes specified as parameters in the metadata, the system transcodes the image for the client, using the metadata parameters, at block 505. As one example, the image may specify a particular region of interest and the transcoding process generates a best fit of that region to the display of the identified client. The system is prioritizing a region of the image based on parameters specified in the metadata, in one embodiment. As another example, the transcoding module may perform color palette adjustment in a manner that optimizes the display of the region of interest. The application server may add additional user interface elements (e.g., a zoom button displayed on a Web page returned to the client with the image) based on the image metadata, for facilitating end user interaction with the particular regions of interest, at block 506. Thereafter, the image is delivered to the client (e.g., via the gateway), as shown at block 507.

Figure 6:
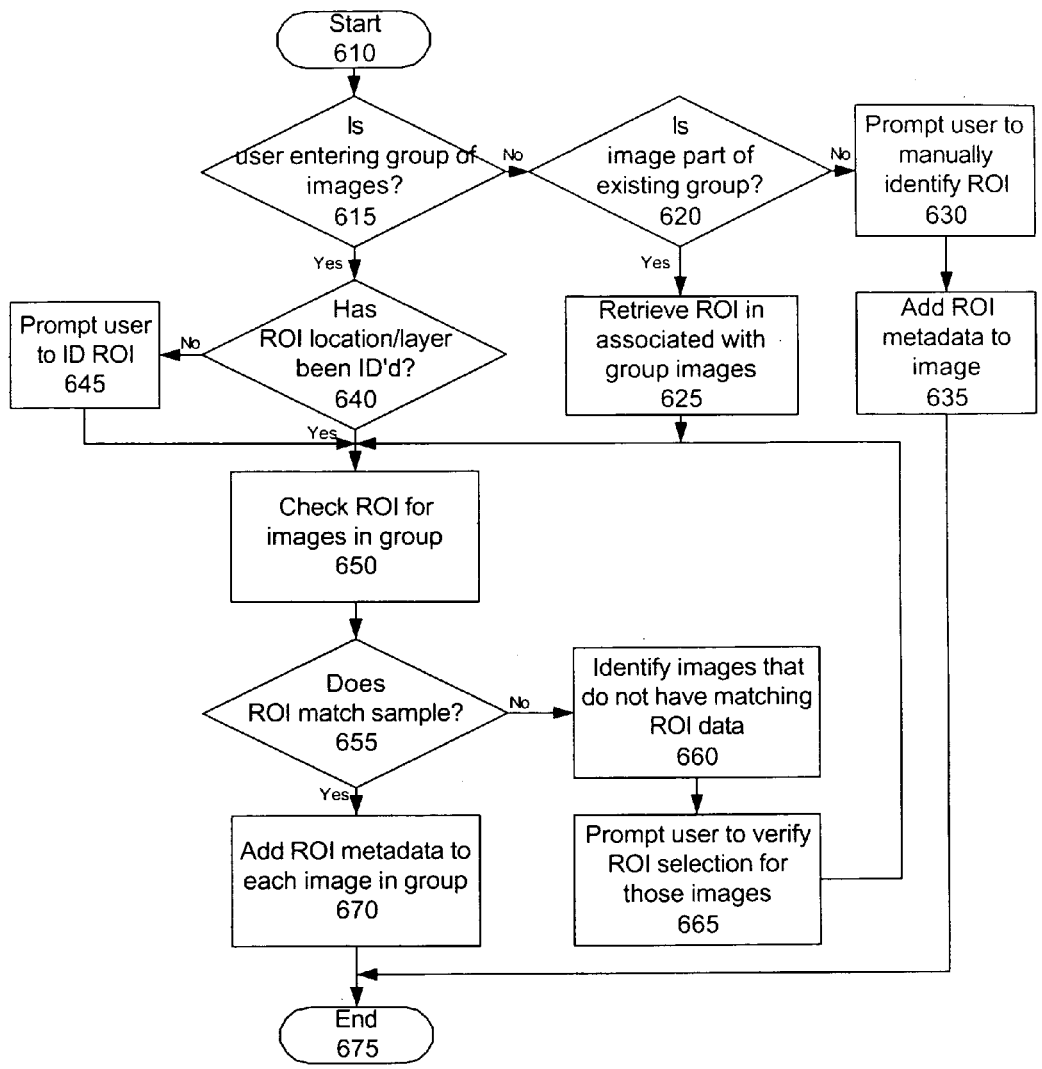
FIG. 6 is a flowchart illustrating one embodiment of semi-automatic metadata creation.

FIG. 6 is a flowchart illustrating one embodiment of semi-automatic metadata creation. The process starts at block 610. At block 615, the process determines whether the currently processed data is part of a group. In one embodiment, an administrator or user can enter a set of data into the system. For example, the user may upload a large data set, such as all photographs from an event, multiple videos, a set of branded data, etc.

The term image is generically used herein for any audio or video data that may have a brand or other identifier attached to it, or may have designated regions of interest.

If the image is not being added as part of a group, the process at block 620 determines if the image is part of an already uploaded group. For example, a user may add additional data to an existing group, with an existing identified Region of Interest (ROI). A user may add additional images to an existing group. If the image is part of the group, the indicated region of interest from that group is retrieved, at block 625. The process then continues to block 650.

Figure 7A:
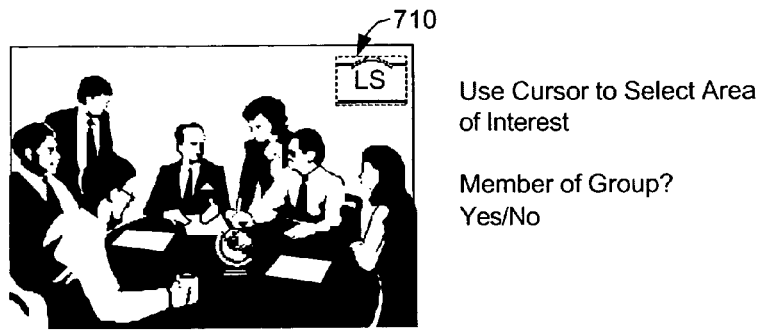
FIGS. 7A-D are illustrations of exemplary images and regions of interest.
Figure 7B:
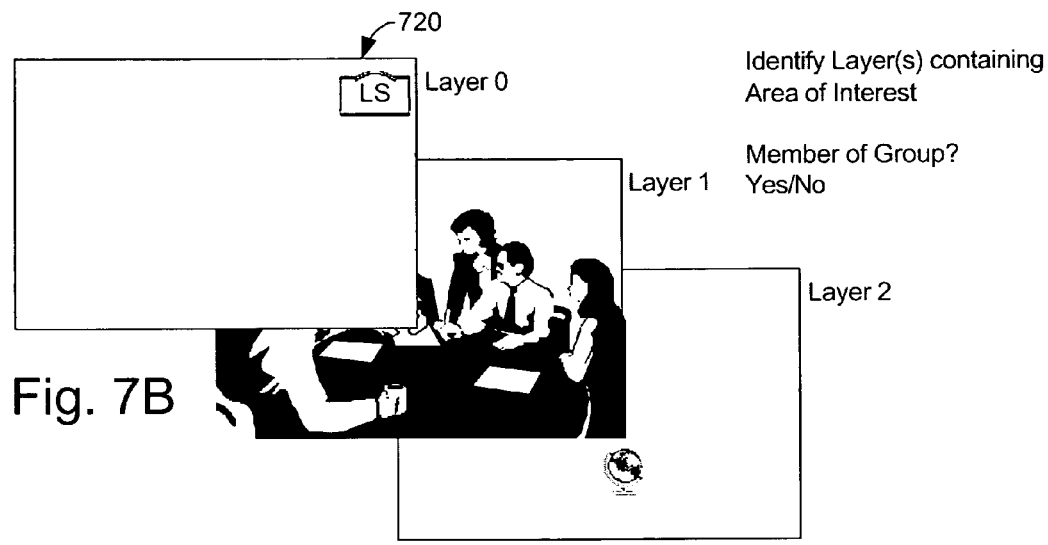
Figure 7C:

If the image is not part of an existing group either, the process, at block 630 prompts the user to manually identify the region of interest within the image. There are numerous ways of identifying a region of interest. In one embodiment, a bounding box may be drawn around a region of interest by the user. This is shown as FIG. 7A. The bounding box may be irregular in shape (as shown in FIG. 7C).

In one embodiment, the system may automatically identify the edges of the selected image, to generate a bounding box. In the image shown in FIG. 7C, in one embodiment, the user may simply click on the ROI—here the magnifying glass—and the system can attempt to discover the boundaries, and show a proposed bounding box, such as the one shown 730. If the user accepts that, it is fine. Alternatively, the user may draw the bounding box around the image manually, or using other tools. In another embodiment, in a layered image, a particular layer may contain the region of interest. This is shown in exemplary form in FIG. 7B, where layer zero includes the region of interest (RoI). In one embodiment, the user may, within the layer, select an area.

Figure 7D:
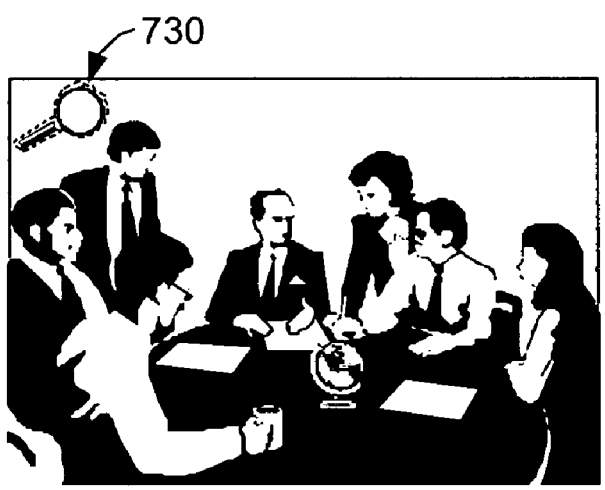

At block 635, the region of interest (ROI) metadata is added to the image. The user, in one embodiment, selects the metadata restrictions on the ROI. FIG. 7D illustrates some exemplary meta-data restrictions that may be added. These restrictions may include, but are not limited to: aspect ratio lock, minimum pixel size, relative size lock, relative location lock, and color range. In one embodiment, these selections may be made from a pull-down menu (for example color range may have the following items in its pull-down menu: 16-color, 256 color, true color); radio buttons, yes/no selection, command-line data entry, or using other selection mechanisms.

The process then ends 675. When the image is being manipulated, the metadata restrictions on the region of interest are observed.

If, at block 615, the process determined that the user is uploading a group of images, the process continues to block 640. At block 640, the process determines whether a region of interest has already been identified for this group of images. In one embodiment, the user identifies the region of interest once, for an entire group of images. If the region of interest has not yet been identified, at block 645, the user may identify the layer or use a bounding box to define the region of interest. In one embodiment, the system may automatically detect one or more regions of interest, as described below with respect to FIG. 8. The process then continues to block 650. If the region of interest has already been identified, the process continues directly to block 650.

At block 650, the process identifies the region of interest for all of the images in the group. At block 655, the process determines whether the region of interest identified in each of the images matches the "expected region of interest." In one embodiment, the region of interest is a brand or logo which is identical for each image. In those instances, in one embodiment, the process determines whether the identical brand appears in each of the regions of interest. In another embodiment, the region of interest may define variable image components, such as faces. In that case, the process determines whether each of the identified regions of interest conform to the selection criteria for such a region of interest. If, at block 655 one or more of the identified regions of interest did not match, the process continues to block 660. At block 660, the images that do not match are identified. At block 665, the user is prompted to make any corrections necessary. The process then returns to block 645, to continue the process.

If all of the images are found to be acceptable at block 655, the process continues to block 670, and the appropriate metadata is added to each of the images in the group. In one embodiment, the user may identify the metadata once for each member of the group. In one embodiment, the user may alter metadata for any individual, group, or subgroup of images. For example, in a large set of images, the user may alter the metadata for a subset of the images that reside in a particular folder, or that are selected by the user. The process then ends at block 675.

Figure 8:
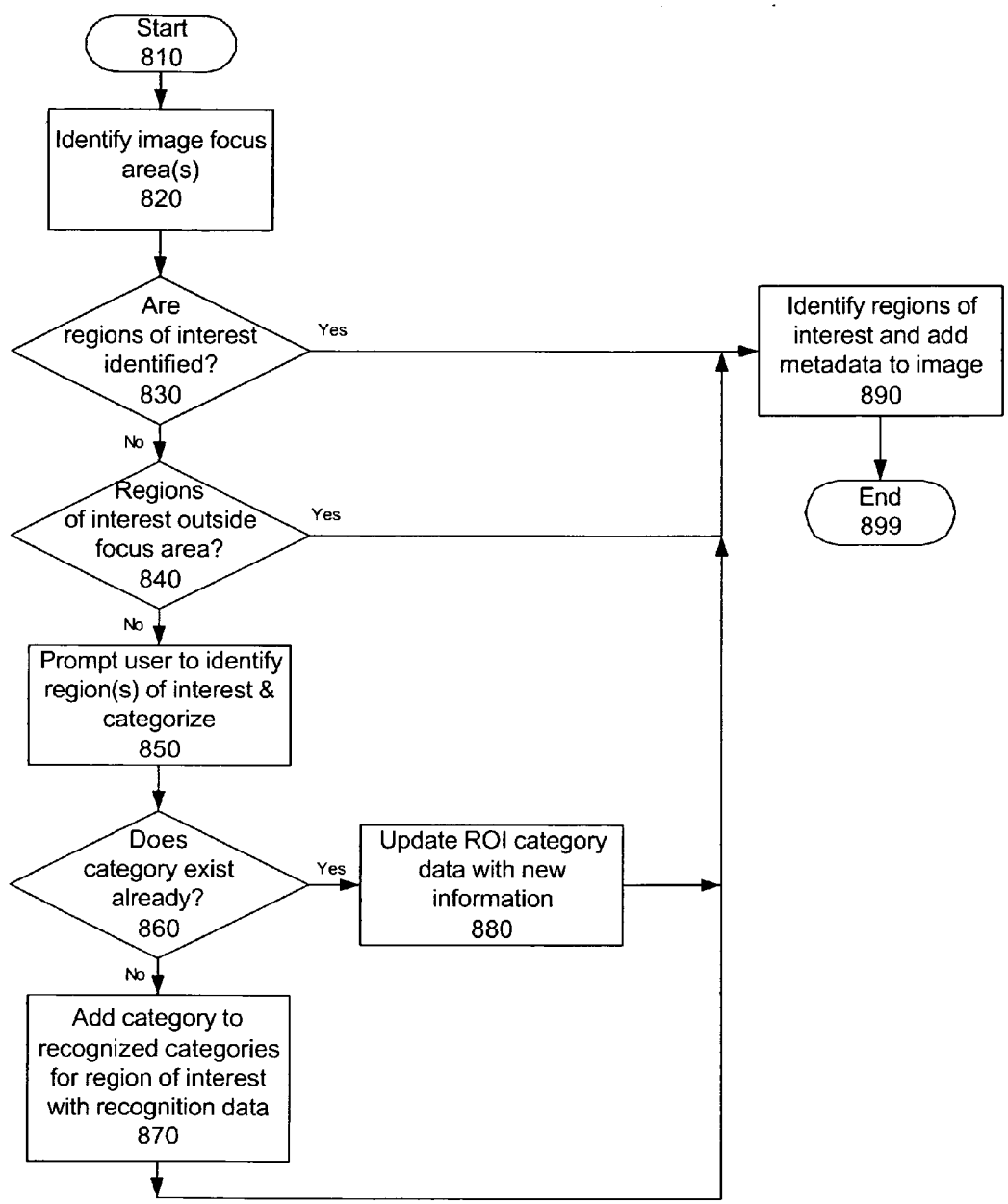
FIG. 8 is a flowchart of one embodiment of automatically detecting regions of interest.

FIG. 8 is a flowchart of one embodiment of auto-detecting a region of interest. This process may correspond to blocks 625, 630, and/or 645. The process starts when one or more images are added to the system for processing. The process starts at block 810.

Figure 9:
FIG. 9 illustrates one embodiment of generating a slide-show from an image.
Figure 9:
Figure 9:
Figure 9:

At block 820, the focus area(s) of the image are identified. At block 830, the process determines whether the focus area(s) of the image include one of a set of possible known regions of interest. Exemplary regions of interest include: faces, buildings, central objects. As shown in FIG. 9, the regions of interest in an image of a meeting may be the faces of the participants. If a region of interest is identified, the process continues to block 890.

If no regions of interest are identified in the focus area, the process continues to block 840. At block 840, the process determines whether one of the set of possible known regions of interest exist in the other portions of the image. In one embodiment, the system may use previous stored images with identified areas of interest to generate possible regions of interest. That is, the system may generalize from known/identified regions of interest to generate the possible regions of interest.

If no regions of interest are identified, the process, at block 850, prompts the user to identify one or more regions of interest manually. In one embodiment the process determines the category of the manually identified region of interest. For example, the region of interest may be a face, a building, an animal, etc. In one embodiment, the user is asked to make the category identification. In one embodiment, the process determines whether the category identified by the user (or automatically identified by the system) already exists, at block 860. If the category does not exist in the known regions of interest, it is added at block 870. In one embodiment, if the category exists but the region of interest was not recognized, the definition of the region of interest is updated, at block 880. The process then continues to block 890.

At block 890, the regions of interest are designated, and the appropriate metadata is attached to them. The process then ends at block 899.

FIG. 9 illustrates one embodiment of generating a slideshow from an image. As described with respect to FIG. 8, in one embodiment the system may detect one or more regions of interest in an image. For example, in a photograph of a scene, the faces of one or more individual participants may be identified as regions of interest. FIG. 9 illustrates an exemplary shot of a group, and what the present system may create from that photograph. As described above with respect to FIG. 8, the system may recognize and identify the regions of interest. The system may then create a slideshow or moving set of images from the single image, showing close-ups of the regions of interest. For example, in the photograph 910, the system may additional create close-ups of each of the participants 920, 930, 940. Thus, when viewed on a small display, such as the display of a camera phone, the user sees the overall large image, and then close-ups of the interesting areas within the image. While the example shown in FIG. 9 is a photograph with individuals, alternative regions of interest in photographs of videos may be recognized. For example, in a photograph of a large panorama, the central building, or image focus, may be the region of interest that is presented in more detail. Similarly, in a scenic video shot of a meadow for example, a butterfly may be recognized as a region of interest. Thus, in addition to restricting the reformatting of regions of interest, as described above with respect to FIG. 7D, the system may further create additional images from the regions of interest to increase the value of the image presentation to the recipient.

While the invention is described in some detail with specific reference to a single-preferred embodiment and certain alternatives, there is no intent to limit the invention to that particular embodiment or those specific alternatives. For instance, the currently preferred embodiment has been illustrated using media objects in the form of images containing branded content (e.g., trademark characters). Those skilled in the art, enabled by the teachings of the present invention, will appreciate that modifications may be made to the preferred embodiment to include support for other media objects (e.g., audio, video, documents, or the like) without departing from the teachings of the present invention.

The invention claimed is:

1. A method comprising:
    storing, by a server, a definition of a region of interest (ROI) within an image, the ROI including associated parameters defined by a content provider applicable to the ROI, the parameters providing one or more restrictions on transcoding the image, the region of interest being one of the following: a brand-associated text and a brand-associated image;
    determining a characteristic of a device on which the image is to be displayed;
    determining whether the device can meet the parameters applicable to the ROI;
    transcoding the image for the device, the transcoding observing the parameters of the ROI, if the device can meet the parameters; and
    preventing a rendering of the image at the device if the device cannot meet the parameters.

2. The method of claim 1, wherein the parameters may include one or more of the following: absolute size, relative size, aspect ratio, color, and color spectrum.

3. The method of claim 1, further comprising:
    automatically identifying the region of interest within the image.

4. The method of claim 1, further comprising:
    prompting a user to identify the region of interest within the image.

5. The method of claim 1, wherein the restrictions comprise one or more of the following: minimum absolute size, minimum relative size, aspect ratio, color, and color spectrum.

6. The method of claim 1, wherein the one or more restriction comprises: generating separate images of the region of interest, if the image is reduced below a preset size.

7. The method of claim 1, further comprising:
    substituting an alternative image for the region of interest, if the image is reduced below a preset size.

8. The method of claim 1, further comprising:
separating out the region of interest into a separate layer of the image prior to processing the image.

9. The method of claim 1, wherein the region of interest and the parameter data are stored as metadata associated with the image.

10. A system comprising:
storage to store an image including a region of interest (ROI) within the image, and parameters defined by a content provider associated with the ROI, the parameters providing one or more restrictions on transcoding the image, the region of interest being one of the following: a brand-associated text and a brand-associated image;
a transcoding module to determine capabilities of a device to which the image is to be sent, to translate the image into a different format observing the restrictions associated with the ROI if the device has the capability to support the parameters, and to prevent a rendering of the image on the device if the device does not have the capability to support the parameters.

11. The system of claim 10, wherein the image includes metadata, the metadata defining the ROI and the parameters associated with the ROI.

12. The system of claim 10, wherein the transcoding module further comprises:
capability determination logic to determine capabilities of the device to which the image is to be sent; and
translation logic to translate the image into proper format observing the restrictions associated with the ROI.

13. The system of claim 12, further comprising:
the translation logic to determine when the image is being resized below a certain size; and
the transcoding module to generate a separate image of the region of interest, such that instead of a single image two or more images are presented to a user, the original image and a larger size version of the region of interest.

14. The system of claim 10, wherein the region of interest is defined as a layer of the image.

15. The system of claim 10, wherein the region of interest is defined as an area within the image.

16. The system of claim 10, further comprising:
data receiving logic to receive the image and an indication of the region of interest; and
an authoring module to separate the region of interest into a separate layer, if the region of interest is not in a separate layer already.

17. The system of claim 10, wherein translation comprises one or more of the following: resizing the image, changing color parameters of an image, changing an aspect ratio of an image, and changing a compression/image format of an image.

18. The system of claim 17, wherein the parameters associated with the region of interest may further restrict one or more of the following: absolute size, relative size, color, and color spectrum.

19. The system of claim 10, wherein the region of interest is one of the following: a person, a building, an object, a trademark, or a service mark.

20. The system of claim 10, further comprising:
an authoring module to enable a user to designate one or more regions of interest in an image and to associate parameters with each of the one or more regions of interest.

21. The system of claim 20, wherein the authoring module enables the user to enter a group of images, and to designate the region of interest and parameters once for the entire group.

22. The system of claim 10, further comprising:
an authoring module to automatically recognize regions of interest and associate a preset set of parameters with the regions of interest.

23. The system of claim 22, wherein the authoring module permits a user to alter or update the regions of interest and/or the parameters.

* * * * *